F. BROSOSKY.
FARM WAGON.
APPLICATION FILED JAN. 26, 1922.
1,428,748.
Patented Sept. 12, 1922.
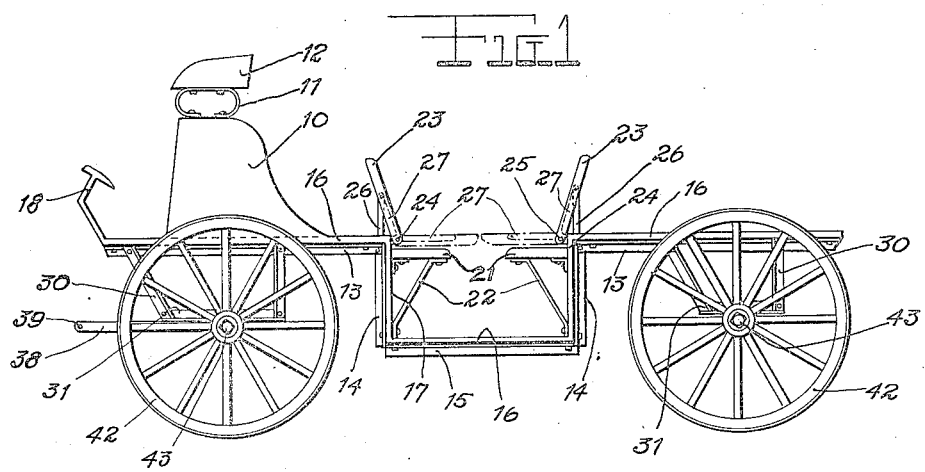
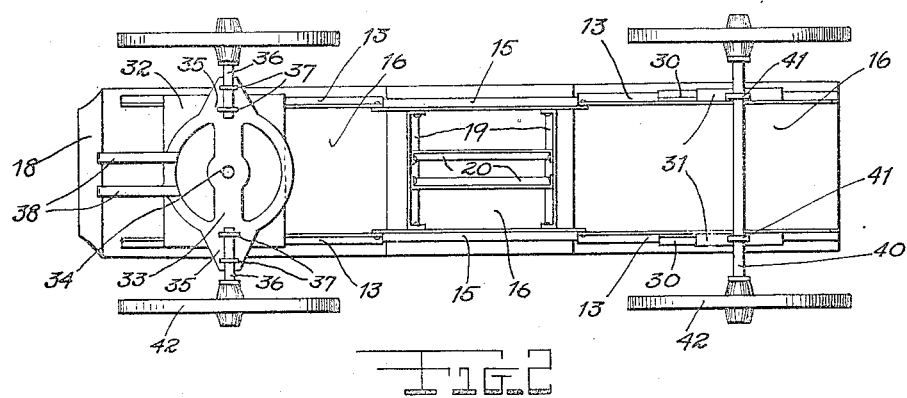
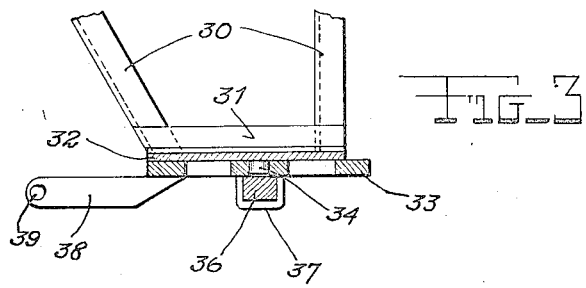
INVENTOR
F. Brososky
BY M. Palmer
ATTORNEY Patented Sept. 12, 1922.

1,428,748

UNITED STATES PATENT OFFICE.

FRANK BROSOSKY, OF HAYWOOD, WEST VIRGINIA, ASSIGNOR OF ONE-HALF TO ANDRZEJ KUBIS, OF MOUNDSVILLE, WEST VIRGINIA.

FARM WAGON.

Application filed January 26, 1922. Serial No. 532,022.

*To all whom it may concern:*

Be it known that I, FRANK BROSOSKY, a citizen of Russia, residing at Haywood, in the county of Harrison and State of West Virginia, have invented certain new and useful Improvements in Farm Wagons, of which the following is a specification.

One of the objects of this invention is to provide a wagon particularly designed for farm use and arranged to carry passengers, farm implements, and field products as required.

Another object is the provision of means by which the seat section may be closed by folding forward the seat backs, presenting a flat surface adapted to carry miscellaneous loads.

These and other objects are obtained by the novel construction and arrangement of parts hereinafter described and shown in the accompanying drawing, forming a material part of this disclosure, and in which:—

Figure 1 is a side elevational view of a wagon made in accordance with the invention.

Figure 2 is an underside plan view of the same.

Figure 3 is a fragmental detail of the front axle bracket, fifth wheel and adjacent elements.

Referring to the drawing in detail, the numeral 10 designates generally the wagon body, carrying springs 11 on which is attached a seat 12.

The frame 13, is constructed of angle irons 14 bent downwardly at about the middle and integrally connected by the longitudinal elements 15.

Floor boards 16 and heel boards 17 are secured rigidly to the frame structure; and at the front of the body is a raised dash or foot board 18, pairs of transverse and longitudinal cross bars 19 and 20 respectively, supporting these floor boards.

Seats 21 are arranged transversely of the wagon and are secured below the floor level at opposite sides of the dropped portion of the body by angle brackets 22.

Backs 23 for these seats are hingedly engaged with co-acting hinge elements 24 and the pins 25, and supports 26, pivoted in receptive slots 27, formed in the back, provide means for maintaining the back in normal position as shown in Figure 1, which also shows by dotted lines, the backs folded upon the seats, providing a substantially level continuous floor surface.

Secured near each end of the body, to the angle iron frame, are pairs of depending brackets 30 each of which is provided with short longitudinal connecting elements 31. To the forward pair of brackets, a rectangular plate 32 is rigidly secured and provides a fixed element for the fifth wheel 33, a pivot 34 connecting the two elements.

The fifth wheel 33 is provided with extending elements 35 upon which are secured the short rectangular axles 36 by a plurality of clamping clips 37.

Integral with the fifth wheel and extending in forward direction, are a pair of offset elements 38 forming a forked extension adapted to engage a pole or shafts therebetween, the hole 39 providing means receptive of a clamp bolt.

A rear axle 40 extends across the body and is rigidly clamped to the rear brackets 30 by the clips 41.

Wheels 42 are rotatably engaged on the extending ends of the axles and are there held by the axle nuts 43.

The foregoing disclosure is to be regarded as descriptive and illustrative only, and not as restrictive or limitative of the invention, of which obviously an embodiment may be constructed including many modifications without departing from the scope of the invention as defined in the claims hereto appended.

Having thus described my invention, what I claim as new and desire to secure by Letters Patent, is:—

1. A farm wagon comprising a body having an offset frame, a floor on said frame, a lowered platform open at the sides and top, seats in said space above said platform below the level of the body floor, seat backs adapted to fold upon the seats forming a continuous level body floor, and means for maintaining said seat backs in either raised of lowered position.

2. A farm wagon, comprising a wheeled vehicle, an offset body frame, a centrally divided opening in the floor, means for closing said opening, a transverse passage formed by the sides of said opening, seats in said passage, backs pivoted adjacent said seats, and means for maintaining the backs in raised position.

In witness whereof I affix my signature.

FRANK BROSOSKY.